May 6, 1930.                J. SACHS                1,757,741
ELECTRIC CIRCUIT CONTROLLING APPLIANCE
Original Filed Sept. 8, 1927     3 Sheets-Sheet 1
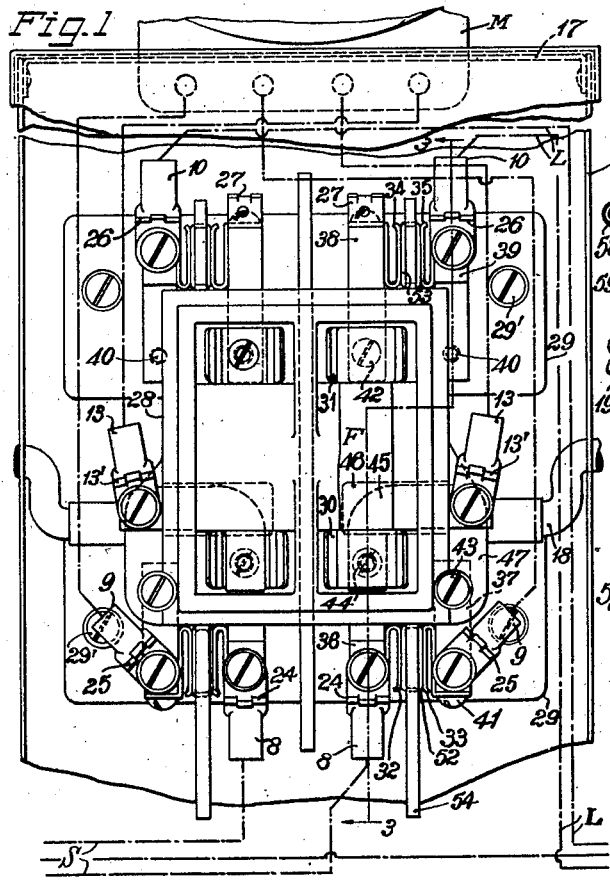
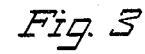
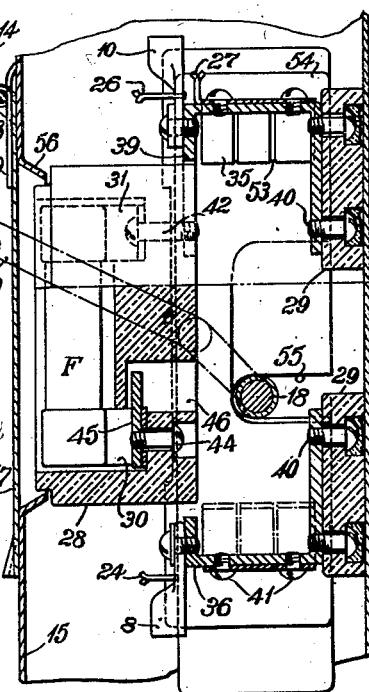
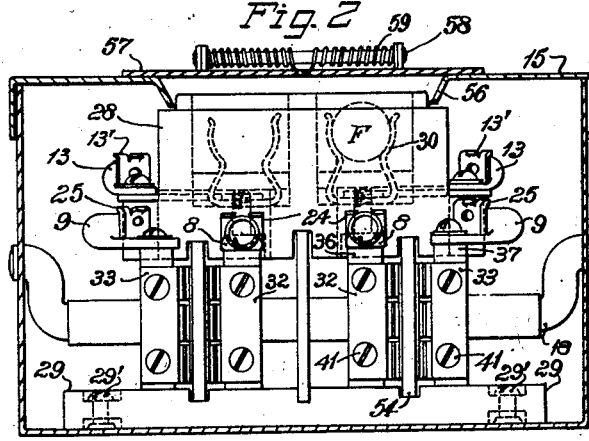
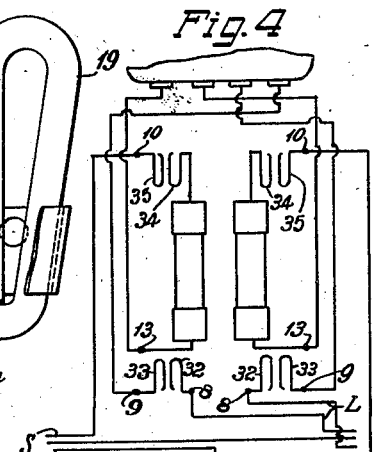
Inventor
Joseph Sachs
By S. Jay Teller
Attorney

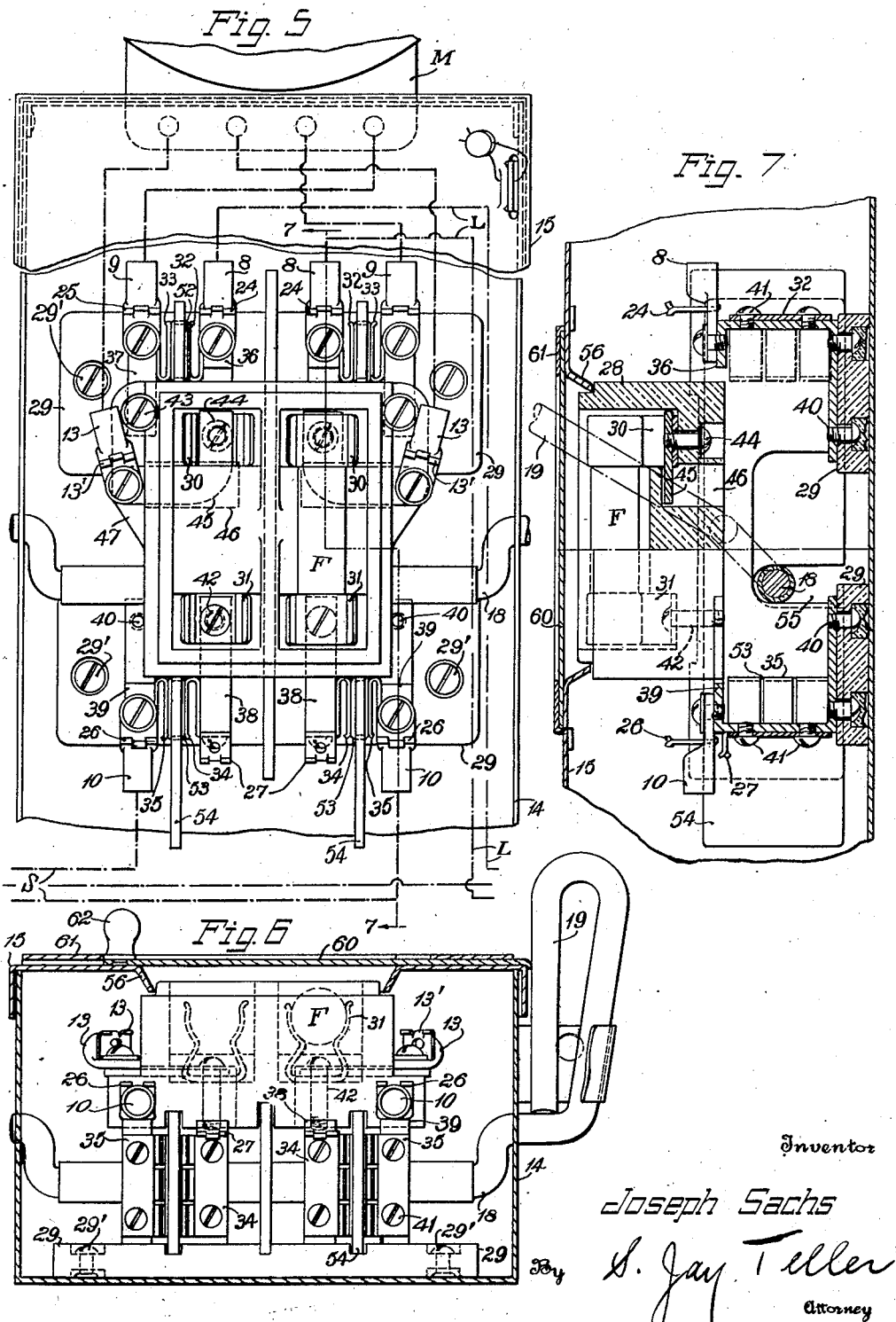

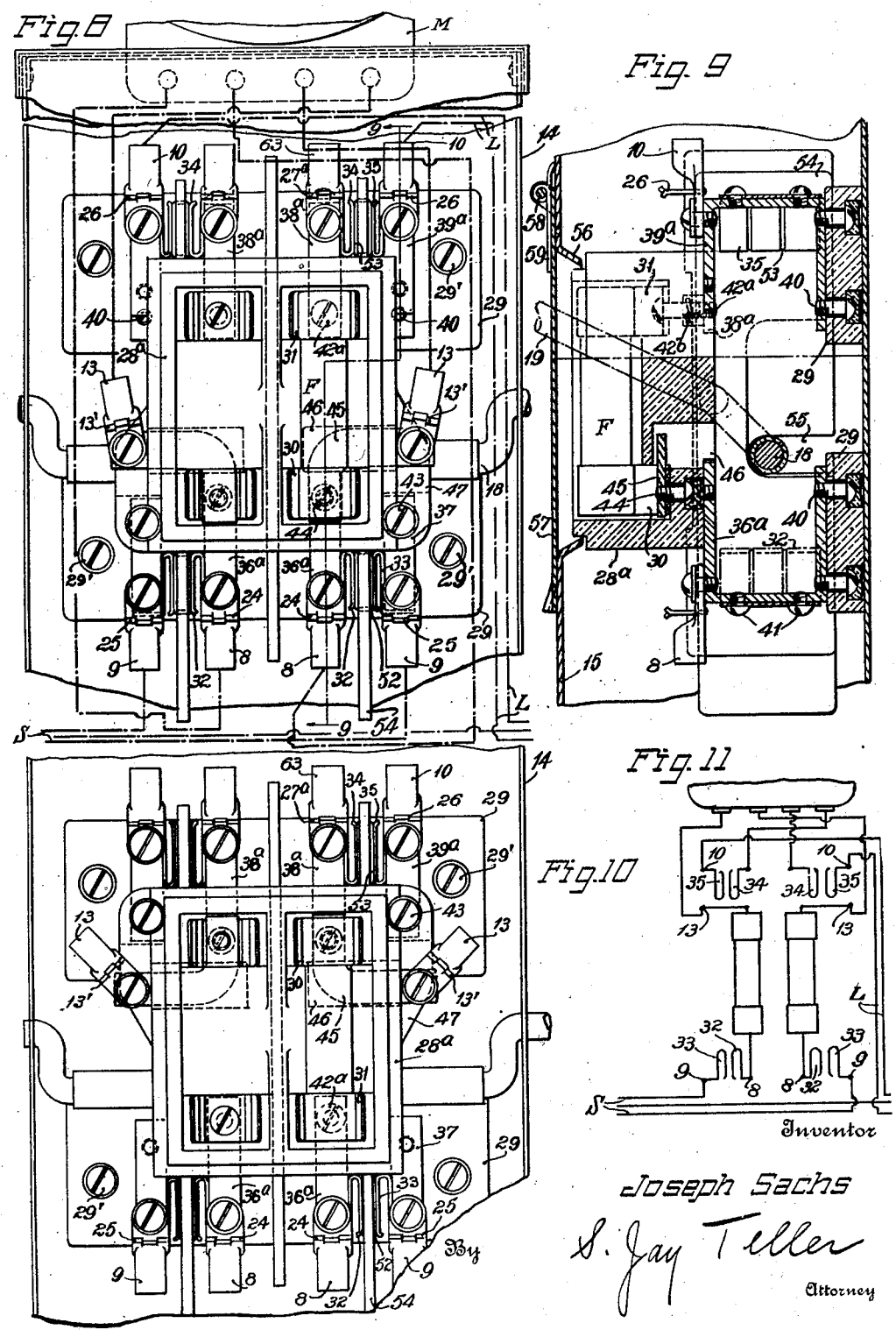

Patented May 6, 1930

1,757,741

UNITED STATES PATENT OFFICE

JOSEPH SACHS, OF WEST HARTFORD, CONNECTICUT

ELECTRIC-CIRCUIT-CONTROLLING APPLIANCE

Application filed September 8, 1927, Serial No. 218,279. Renewed December 7, 1929.

The invention relates particularly to an electric circuit controlling appliance of the type disclosed in my patents for electric circuit controlling appliances No. 1,754,443 and No. 1,754,445 both issued April 15, 1930.

One object of the invention is to provide an appliance which is of the type specified as concerns its mechanical construction, but which nevertheless embodies certain structural modifications for the purpose of providing and facilitating electrical connections such as described in copending application for electric meter service appliances, Serial No. 188,793 filed May 4, 1927. This present application constitutes a continuation in part of the copending application last above mentioned.

A further object of the invention is to provide a fused switch appliance of the type specified wherein certain parts are bodily reversible with respect to the other parts to facilitate the provision of optionally usable electrical connections as will be fully set forth in detail. In accordance with this phase of the invention the entire fused switch unit may be reversed with respect to the enclosing cabinet or the fuse carrying base may be reversed with respect to the switch parts and the cabinet.

Still further objects of the invention will be apparent from the following specification and claims.

In the accompanying drawings I have shown two embodiments of the invention but it will be understood that these embodiments have been selected for illustrative purposes only and it will further be understood that the drawings are not to be construed as defining or limiting the scope of the invention, the claims forming a part of this specification being relied upon for that purpose.

Of the drawings:

Fig. 1 is a front view of a fused switch appliance embodying the invention, the cover of the cabinet being removed and certain parts being broken away.

Fig. 2 is a bottom view of the appliance shown in Fig. 1, the enclosing cabinet being shown in section.

Fig. 3 is a fragmentary vertical sectional view taken along the line 3—3 of Fig. 1.

Fig. 4 is a diagram of alternate electrical connections.

Figs. 5, 6, and 7 are views similar respectively to Figs. 1, 2 and 3 but showing the several parts of the appliance assembled in a different relationship.

Figs. 8 and 9 are views similar respectively to Figs. 1 and 3 but showing an alternate embodiment of the invention.

Fig. 10 is a view similar to Fig. 8 but showing the several parts assembled in a different relationship.

Fig. 11 is a diagram of electrical connections which may be provided with the arrangement shown in Fig. 10.

An appliance embodying the invention preferably includes a fused switch unit and a casing or cabinet for enclosing the said unit. Referring particularly to Figs. 1 to 3 of the drawings it will be observed that the parts of the fused switch unit of the appliance are symmetrically disposed with respect to the vertical central plane of the said unit. For the sake of convenience and simplicity of description I will describe in detail only those parts on one side of the said plane, it being understood that the parts on the other side are or may be the same in construction except for reversal of positions.

As illustrated the fused switch unit includes an insulating base 28 mounted in fixed spaced relationship with the rear supporting wall which may be the rear wall of an enclosing cabinet. Preferably the fused switch unit also includes a second insulating means which serves as a supporting device and is secured directly to the said supporting wall. This insulating means may comprise two separate members 29, 29 secured to the back of the cabinet by suitable means such as screws 29′, 29′. The several conducting parts of the fused switch unit are connected with the insulating members 28 and 29, 29.

The fuse contacts are represented at 30 and 31, these being carried directly by the base 28, ordinarily at the front thereof. I have shown contacts for receiving a fuse F of the cartridge enclosed type, but I do not necessarily so limit myself. Located in normally fixed relation to the fuse contacts and preferably at least in part in the space behind the plane of the rear face of the base 28 are two switching devices which may be variously constructed as concerns certain of the broader phases of the invention. Preferably, however, each of these switch devices comprises two opposed stationary switch contacts and a rectilinearly movable switching means which includes a contact adapted to engage or disengage both of the stationary contacts to make or break the electrical connections between them. The preferred construction as shown is similar to the constructions disclosed in my said patents.

The opposed stationary contacts for one switch device are represented at 32 and 33 and the opposed stationary switch contacts for the other switch device are indicated at 34 and 35. The several stationary switch contacts include supporting elements 36, 37, 38 and 39 which project forward from the supporting devices 29, 29 and which may be secured thereto by screws 40, 40. Each of the switch contacts also comprises a contacting portion which is preferably of a general U-shape and is provided with a laterally extending flange engaging the corresponding supporting element. Screws or rivets 41, 41 extend through the flange and into the supporting elements to hold the switch contacts in place. As illustrated the stationary switch contacts are positioned respectively below and above the fuse carrying base.

I provide means whereby electrical connection may be made between one fuse contact and one switch contact of one pair. To this end the supporting element 38 is preferably extended downward to a position directly back of the fuse contact 31 and a screw 42 extends through the fuse contact and through the base 28 into the said supporting element 38. Thus the screw 42 serves to establish an electrical connection between the said fuse contact and the supporting element 38 which in turn is electrically connected with the switch contact 34 as already described, and at the same time the screw serves to hold the fuse contact 31 in place on the base. In addition the said screw and the supporting element 38 serve as one of the means for holding the base in fixed relationship with the supporting device 29, 29. The supporting element 37 is extended upward and is engaged by a screw 43, the said screw and supporting element serving as another means for holding the base 28 in fixed relationship with the supporting device 29.

The remaining fuse contact 30 is held in place on the base 28 by a screw 44 which also retains a conducting member 45. The said member 45 extends from the fuse contact to a point adjacent or beyond the edge of the base. Preferably the said member 45 is in the form of a strap which extends upward and laterally from the fuse contact, being positioned in part in a recess 46 which extends forward from the back face of the base. The outer end portion of the strap 45 extends in front of a ledge 47 formed on the base at the side thereof.

For making and breaking electrical connection between the stationary switch contacts of the two pairs there are provided two rectilinearly movable switch contacts which are preferably carried by a single flat insulating element as described in detail in my aforesaid Patent No. 1,754,443. The two movable switch contacts are shown at 52 and 53 respectively and the flat insulating element is shown at 54, the said insulating element with the movable switch contacts thereon constituting a switching member. The switching member is guided at the front by the base 28 and at the rear by the supporting device 29, 29. It will be understood that when the switching member is moved the two contacts 52 and 53 are moved to simultaneously engage and disengage the respective pairs of switch contacts 32 and 33, and 34 and 35 and thus make and break the electrical connection through the switching devices. It will be further understood that the switching members move upward from the positions shown to break the circuit.

Connected respectively with the supporting elements 36 and 37, with the end of the strap 45 and with the supporting element 39 are wire connecting terminals 8, 9, 13 and 10. It will be obvious that the said terminals 8, 9, 13 and 10 are electrically connected respectively with the switch contact 32, the switch contact 33, the fuse contact 30 and the switch contact 35.

The fused switch device is preferably mounted in a suitable casing or cabinet such as the cabinet 14 shown in the drawings. The cabinet 14 is shown as being provided with a pivoted front cover 15 which is hinged to one wall as for instance the bottom end wall, so as to be openable to permit access to the switch and fuse parts. The cover may be locked in closed position by means of a latch 16 (see Fig. 5) and if desired a seal may be inserted through the latch in the usual way to definitely prevent the opening of the cabinet except by breaking the seal. Suitable provision is made for the protective association of the cabinet with an electric meter. With a meter such as indicated at M, one wall of the cabinet, in this case the upper end wall 17 thereof has an opening therein of such size and shape as to substantially fit the terminal chamber portion of the meter, the said terminal chamber portion projecting for a short distance into the cabinet and substantially closing the said opening in the end wall 17. Inasmuch as the meter M projects into the cabinet, the cabinet serves as a means not only for protectively enclosing the switch and fuse parts but for also protectively enclosing the connections between the switch and fuse parts and the meter. The end wall construction is not shown in detail as it does not of itself constitute a part of the present invention.

I provide a suitable means for operating the switching members, this means being accessible at all times even though the switch devices are enclosed as preferred and as described. I have shown this operating means as comprising a spindle 18 which extends through bearing apertures in the side walls of the cabinet and which is provided with an operating handle 19 on the exterior of the cabinet. Within the cabinet the operating spindle 18 is provided with a cranked portion which extends through a slot 55 formed in the insulating element 54 of the movable switching member. When the parts already described at the right hand side of the base 1 are duplicated at the left hand side thereof as shown in the drawings, the one operating spindle 18 serves to operate both of the switching members so as to make and break the respective circuit connections substantially simultaneously.

An appliance embodying the invention is particularly adapted, when associated with a meter as shown, to provide an electrical sequence of service wire-switch-meter-fuse-switch-load wire or an electrical sequence of service wire-switch-fuse-meter-switch-load wire, all as fully described in my said copending application Ser. No. 188,793. The construction as shown is adapted for a three wire circuit and with the parts arranged as shown in Figs. 1 to 3 two of the service wires S may be connected with the terminals 8, 8. The meter coils may be connected respectively between the terminals 9, 9 and 13, 13 and two of the load wires L may be connected with the terminals 10, 10 all as indicated in Fig. 1. It will be seen that with the connections made as described the circuit is from the contact 8 through the switch contacts 32, 52 and 53 to the terminal 9 and the meter. Beyond the meter the circuit is from the terminal 13 through the fuse and through the switch contacts 34, 53 and 35 to the load terminal 10. Thus there is provided an electrical sequence of service wire-switch-meter-fuse-switch-load wire. By making other connections as will presently appear I may provide an electrical sequence of service wire-switch-fuse-meter-switch-load wire.

In order to facilitate the connection of instrument leads for the testing of the meter the fused switch shown in Figs. 1 to 3 is provided with auxiliary test contacts 24, 25, 26, and 27 these corresponding electrically to the wire terminals 8, 8 and 10 and the switch contact 34 as shown in Figs. 1 to 3. Other test contacts 13' may be provided on the terminals 13.

It will be understood that, in preparation for meter testing, the service wires can be connected with the load wires by direct bypass connections from the test contacts 24, 24, to the test contacts 26, 26 and that the meter can be then entirely disconnected from both the service and the load wires by moving the switching member 54, 54 upward as already fully described. Testing of the meter can then be effected in any usual or preferred way, testing instrument leads being connected to the test contacts 25, 25 and 27, 27 which are connected with the meter coils. It will be noted that the contacts 27, 27 are connected with the meter coils through the fuses so that the fuses are in the circuit to protect the meter during testing.

For some methods of meter testing it is necessary to have the meter coils in connection with the service wires but out of connection with the load. In order to connect the meter with the service wires when the normal connection is broken by the opening of the switches, by-pass connections may be provided between the test contacts 24, 24 and the test contacts 25, 25.

The cover 15 of the cabinet is preferably provided with an opening through which the fuse contacts and the fuses are accessible when the cover is closed, the said cover nevertheless keeping the switching devices and other parts inaccessible. The opening in the cover is shown at 56, the base 28 being so formed and positioned as to substantially close the opening when the cover is closed. As shown the base 28 has a barrier at the front which entirely surrounds the fuse contacts and the fuses and which extends forward to close the said opening 56. This barrier has an open-sided recess therein through which the aforesaid strap 45 extends. As the result of the construction as described it is substantially impossible for all practical purposes to obtain access to any of the live conducting parts within the cabinet, except the fuse contacts and the fuses, after the cover has been closed and sealed.

Preferably an auxiliary cover is provided normally closing the opening 56 in the cover 15 and protecting the fuses. When the fuses are connected after the meter this cover may be constructed and arranged as shown at 57 so that it may be opened at any time. As shown the cover 57 is pivoted at 58, being normally held closed by a spring 59. This cover may be manually opened whenever it is desired to obtain access to the fuses.

In the diagram in Fig. 4 I have illustrated the fact that with the construction shown in Figs. 1 to 3 the connections of the service wires and the load wires may be reversed so as to provide a sequence of switch-fuse-meter-switch instead of a sequence of switch-meterfuse-switch. The connections as shown in Fig. 4 when used with the construction shown in Figs. 1 to 3 require reversed positions of the service and load wires which may not be the preferred arrangement. Furthermore with the fuses ahead of the meter it would ordinarily be desirable to provide additional means, as hereinafter described, to prevent the stealing of current from the fuse contacts.

In order to provide for the connection of the fuse ahead of the meter as shown in Fig. 4 but without reversing the positions of the service and load wire connections I preferably make provision for the bodily reversal of the base and of the fuse contacts carried thereby with respect to the cabinet and ordinarily with respect to the operating spindle. With the parts thus reversed the direct electrical connections from the fuse contacts 31, 31 extend to the switch contacts of the lower switching devices instead of to switch contacts of the upper switching devices. The reversal as above described is preferably effected without any material change in the construction of the parts. Inasmuch as the construction is such that reversal may be easily effected it is possible at the option of the manufacturer or of the user to cause the connection from the said fuse contacts 31, 31 to extend as desired either between the said fuse contacts and the upper switch devices or between the said fuse contact and the lower switch devices. Thus it is possible, by effecting reversal as described, to provide as desired a sequence of switch-meter-fuse-switch or of switch-fuse-meter-switch without making any change in the relative positions of the service and load wire connections.

The base 28 with its attached parts may be reversed independently of the other parts of the appliance or the entire fused switch unit (except the movable switching member) may be reversed. In Figs. 5 to 7 I have shown the entire unit reversed, the screws 29', 29' forming the holding means for the supporting device 29 being arranged to permit this reversal. The movable switching members retain the same positions in relation to the operating spindle and the cabinet as shown in Figs. 1 to 3. It will be observed that this reversed position brings the terminals 10, 10 at the bottom and the terminals 8, 8 at the top. The terminals 13, 13 are preferably shifted in position with respect to the straps 45, 45 as shown. The service wires S are connected with the terminals 10, 10 and the load wires L are connected with the terminals 8, 8. The meter is connected between the terminals 13, 13 and the terminals 9, 9 as before. With these connections the electrical sequence is service wire-switch-fuse-meter-switch-load wire, as shown diagrammatically in Fig. 4, but the service wire connections remain at the bottom and the load wire connections remain at the top as in Figs. 1 to 3.

With the fuse ahead of the meter as illustrated it is preferable to provide a cover for the fuses which prevents access to the said fuses except when the switches are open. Accordingly I have shown a transversely slidable cover 60 which is held and guided by means of a member 61. The cover 60 is provided with a knob 62 by means of which it may be moved laterally. With the parts in the positions shown the cover 60 is obstructed by the handle 19 so that the cover cannot be opened to expose the fuses so long as the handle 19 remains in the switch closing position. However, when the handle is moved downward so as to move the switching members 54, 54 upward to open the circuit the cover is then free to be moved laterally toward the right to permit access to the fuse contacts and the fuses; but with the cover thus moved laterally it is impossible to move the handle 19 upward to close the circuit. The interlocked cover and handle construction as disclosed constitutes no part of the present invention, being set forth in my patents for enclosed fused switches, Nos. 1,721,493, 1,721,494 and 1,721,495 all issued July 16, 1929.

It will be understood that the cabinet as shown in Figs. 5 to 7 is or may be exactly the same as that shown in Figs. 1 to 3 except for the different cover construction as already described. Therefore it is obviously possible for the manufacturer to furnish a meter service appliance adapted for connection with the fuse beyond the meter by mounting the fused switch unit as shown in Figs. 1 to 3 and furnishing the cover construction as shown in the same figures; or it is possible for the manufacturer to furnish a meter service appliance adapted for connection with the fuse ahead of the meter by mounting the fused switch unit as shown in Figs. 5 to 7 and furnishing the cover construction as shown in the same figures. The manufacturer can thus meet different requirements without the necessity for providing entirely separate appliances, the result being that the manufacturing cost is reduced and that the numbers of appliances necessary to be carried in stock may be greatly reduced. It will of course be understood that the interlocked cover construction may if desired also be used with the arrangement shown in Figs. 1 to 3.

Figs. 8 to 11 show an appliance similar to that already described but constructed to permit the fuse base with the fuse contacts thereon to be reversed independently of the switch parts of the appliance. The construction preferably also permits the entire fused switch unit to be reversed as already described.

The construction shown in Figs. 8 to 11 is or may be similar to that already described and repetition of the description is unnecessary except in so far as differences in construction appear. The supporting elements 36ª, 36ª are extended upward to positions directly back of the corresponding fuse contacts, the upward extension of the element 36ª, 36ª being similar to the downward extensions of the element 38, 38. Similarly the supporting elements 39ª, 39ª are extended downward, the downward extensions thereof being similar to the upward extension of the supporting element 37, 37. Additional wire receiving terminals 63, 63 are or may be connected with the supporting elements 38ª, 38ª, these being provided with test contacts 27ª. The screws 42ª, 42ª for the fuse contact 31, 31 are preferably provided with washers 42ᵇ which prevent removal of the screws and the corresponding fuse contacts from the base without interfering with their disengagement of the said screws from the supporting elements.

With all of the supporting elements extending upward and downward as described it will be apparent that the fuse base 28ª can be mounted upon the said supporting elements in either of two positions, that is, as shown in Figs. 8 and 9 or as shown in Fig. 10. The screws 42ª, 42ª constitute separable electrical connecting means adapted to be disengaged and re-engaged to permit this reversal. As shown in Figs. 8 and 9 there are direct electrical connections through the screws 42ª, 42ª between the fuse contact 31, 31 and switch contacts of the upper pairs that is, the switch contacts 34, 34. With the base and the attached parts reversed as shown in Fig. 10, there are direct electrical connections through the screws 42ª, 42ª between the fuse contact 31, 31 and switch contacts of the lower pairs, that is the switch contact 32, 32. It will be understood that the screws 43, 43, for holding the base in place may be engaged either with the supporting elements 37, 37 or with the supporting elements 39ª, 39ª.

As shown in Figs. 8 and 10 the service wires are preferably connected with the lower outer terminals, that is, the terminals 9, 9, and the load wires are preferably connected with the upper outer terminals, that is, the terminals 10, 10. The respective service and load wires are thus in vertical alignment with each other and the attachment of by-pass connections is facilitated.

With the arrangement shown in Fig. 8 the meter coils are connected between the terminals 8, 8 and 13, 13, thus providing a sequence of service wire-switch-meter-fuse-switch-load wire. The terminals 63, 63 are not used or may be omitted if desired. With the arrangement shown in Figs. 10 and 11 the meter coils are connected between the terminals 13, 13 and 63, 63, thus providing a sequence of service wire-switch-fuse-meter-switch-load wire. The terminals 8, 8 are not used and may be omitted if desired.

With the arrangement shown in Figs. 8 and 9 it is sufficient to provide a cover of the type shown in Figs. 1 to 3, but the arrangement shown in Fig. 10 is preferably to provide a cover of the type shown in Figs. 5 to 7.

It will be apparent that if preferred, the entire fused switch unit may be reversed as shown in Figs. 5 to 7, instead of reversing the fuse base only as shown in Fig. 10. With the parts arranged as shown in Figs. 8 and 9 I make provision for electrical connections exactly as shown in Fig. 1, with an electrical sequence of service wire-switch-meter-fuse-switch-load wire. By bodily reversing the entire fused switch unit (except the movable switching members) as shown in Figs. 5 to 7, or by reversing only the fuse base and the parts carried thereby as shown in Fig. 10, I provide an electrical sequence of service wire-switch-fuse-meter-switch-load wire.

What I claim is:

1. In a fused switch appliance, the combination of a pair of fuse contacts, two pairs of opposed stationary switch contacts in normally fixed relation to the fuse contacts, a movable switching member comprising two conducting elements respectively movable between the switch contacts of the corresponding pairs to make and break electrical connections between them, two wire terminals connected respectively with one switch contact of one pair and with one switch contact of the other pair, means whereby electrical connection may be established between one fuse contact and the remaining switch contact of one pair, and two other wire terminals connected respectively with the remaining switch contact of the other pair and with the remaining fuse contact.

2. In a fused switch appliance, the combination of a pair of fuse contacts, an insulating base for supporting the fuse contacts, two pairs of opposed stationary switch contacts in normally fixed relation to the fuse contacts and located at least in part behind a transverse plane through the rear part of the base, a rectilinearly movable switching member located at least in part behind the said base and comprising two conducting elements respectively movable between the switch contacts of the corresponding pairs to make and break electrical connections between them, two wire terminals connected respectively with one switch contact of one pair and with the one switch contact of the other pair, means whereby electrical connection may be established between one fuse contact and the remaining switch contact of one pair, and two other wire terminals connected respectively with the remaining switch contact of the other pair and with the remaining fuse contact.

3. In a fused switch appliance, the combination of a pair of fuse contacts, an insulating base for supporting the fuse contacts, two pairs of opposed stationary switch contacts in normally fixed relation to the fuse contacts and located at least in part behind a transverse plane through the rear part of the base, a rectilinearly movable switching member located at least in part behind the said base and comprising two conducting elements respectively movable between the switch contacts of the corresponding pairs to make and break electrical connections between them, two wire terminals connected respectively with one switch contact of one pair and with one switch contact of the other pair, a conducting element directly connected with the base and connected between one fuse contact and the remaining switch contact of one pair, and two other wire receiving terminals connected respectively with the remaining switch contact of the other pair and with the remaining fuse contact.

4. In a fused switch appliance, the combination of a pair of fuse contacts, an insulating base for supporting the fuse contacts, two pairs of opposed stationary switch contacts in normally fixed relation to the fuse contacts and located at least in part behind a transverse plane through the rear part of the base, a rectilinearly movable switching member located at least in part behind the said base and comprising two conducting elements respectively movable between the switch contacts of the corresponding pairs to make and break electrical connections between them, two wire terminals at opposite ends of the base connected respectively with one switch contact of one pair and with one switch contact of the other pair, means whereby an electrical connection may be established between one fuse contact and the remaining switch contact of one pair, and two other wire receiving terminals one located at one end of the base and connected with the remaining switch contact of the other pair and the other located at one side of the base and connected with the remaining fuse contact.

5. In a fused switch appliance, the combination of a pair of fuse contacts, an insulating base for supporting the fuse contacts, two pairs of opposed stationary switch contacts in normally fixed relation to the fuse contacts and located at least in part behind a transverse plane through the rear part of the base, a rectilinearly movable switching member located at least in part behind the said base and comprising two conducting elements respectively movable between the switch contacts of the corresponding pairs to make and break electrical connections between them, two wire terminals at opposite ends of the base connected respectively with one switch contact of one pair and with one switch contact of the other pair, a conducting element directly connected with the base and connected between one fuse contact and the remaining switch contact of one pair, and two other wire receiving terminals one located at one end of the base and connected with the remaining switch contact of the other pair and the other located at one side of the base and connected with the remaining fuse contact.

6. In a fused switch appliance, the combination of a pair of fuse contacts, an insulating base serving to support the fuse contacts and having a barrier surrounding the fuse contacts and formed with an open-sided recess therein, two pairs of opposed stationary switch contacts in normally fixed relation to the fuse contacts and located at least in part behind a transverse plane through the rear part of the base, a rectilinearly movable switching member located at least in part behind the said base and comprising two conducting elements respectively movable between the switch contacts of the corresponding pairs to make and break electrical connections between them, two wire terminals at opposite ends of the base connected respectively with one switch contact of one pair and with one switch contact of the other pair, a conducting strap located in the said recess in the base and electrically connected with one fuse contact, means whereby an electrical connection may be established between the other fuse contact and the remaining switch contact of one pair, and two other wire terminals one located at one end of the base and connected with the remaining switch contact of the other pair and the other located at one side of the base and connected with the said strap.

7. In a fused switch appliance, the combination of an insulating base, means for detachably supporting the base in normally fixed relationship with a rear supporting wall, a pair of contacts on the base, two pairs of opposed stationary switch contacts mounted in normally fixed relation to the rear supporting wall and located at least in part behind a transverse plane through the rear part of the base, a rectilinearly movable switching member located at least in part behind the said base and comprising two conducting elements respectively movable between the switch contacts of the corresponding pairs to make and break electrical connections between them, two wire terminals supported independently of the base and connected respectively with one switch contact of one pair and with one switch contact of the other pair, means whereby a separable electrical connection may be established between one fuse contact and the remaining switch contact of one pair, and two other wire terminals one electrically connected with the remaining fuse contact and the other supported independently of the base and connected with the remaining switch contact of the other pair.

8. In a fused switch appliance, the combination of an insulating base, two fuse contacts on the base, upper and lower switch devices each comprising a pair of switch contacts and a movable switching means, manually operable means for moving the said switching means to make and break electrical connection between the contacts of the respective devices, upper and lower wire terminals connected respectively with switch contacts of the two devices, a wire terminal connected with one fuse contact independently of the switch devices, means whereby an electrical connection may be established between the other fuse contact and one switch contact of one device, and supporting means permitting the base with the fuse contacts thereon to be bodily reversed in position so that the said electrical connection may extend as desired either between the last said fuse contact and a switch contact of the upper device or between the last said fuse contact and a switch contact of the lower device.

9. In a fused switch appliance, the combination of an insulating base, two fuse contacts on the base at the front thereof, upper and lower pairs of opposed stationary switch contacts, a movable switching member comprising two conducting elements normally engaging the switch contacts of the corresponding pairs to establish electrical connections between them, manually operable means supported independently of the base for moving the said switching member to disengage the conducting elements thereof from or to re-engage them with the said switch contacts, upper and lower wire terminals connected respectively with switch contacts of the two pairs, a wire terminal connected with one fuse contact independently of the switch contacts, an electrical connection extending directly between the other fuse contact and one switch contact of the one pair, and supporting means permitting the base with the fuse contacts thereon to be bodily reversed in position with respect to the said manually operable means so that the said electrical connection may extend as desired either between the last said fuse contact and a switch contact of the upper pair or between the last said fuse contact and a switch contact of the lower pair.

10. In a fused switch appliance, the combination of an insulating base in normally fixed spaced relationship to a rear supporting wall, a pair of fuse contacts on the base at the front thereof, upper and lower pairs of opposed stationary switch contacts located at least in part behind a transverse plane through the rear part of the base, a rectilinearly movable switching member located at least in part behind the said base and comprising two conducting elements normally engaging the switch contacts of the corresponding pairs to establish electrical connections between them, manually operable means supported independently of the base for moving the said switching member substantially parallelly with the rear face of the base to disengage the conducting elements thereof from or to re-engage them with the said switch contacts, upper and lower wire terminals connected respectively with switch contacts of the two pairs, a wire terminal connected with one fuse contact independently of the switch contacts, an electrical connection extending directly between the other fuse contact and one switch contact of one pair, and supporting means permitting the base with the fuse contacts thereon to be bodily reversed in position with respect to the said manually operable means so that the said electrical connection may extend as desired either between the last said fuse contact and a switch contact of the upper pair or between the last said fuse contact and a switch contact of the lower pair.

11. In a fused switch appliance, the combination of an enclosing cabinet having an openable front cover having an opening therein, an insulating base in normally fixed position within the cabinet, a pair of fuse contacts on the base at the front thereof and accessible through the said cover opening with the cover closed, upper and lower switch devices within the cabinet each comprising a pair of switch contacts and a movable switching means, the said switch devices being inaccessible through the said cover opening with the cover closed, means manually operable from the exterior of the cabinet for moving the said switching means to make and break electrical connection between the contacts of the respective devices, upper and lower wire terminals within the cabinet connected respectively with switch contacts of the two devices, a wire terminal within the cabinet connected with one fuse contact independently of the switch devices, an electrical connection extending directly between the other fuse contact and one switch contact of one device, and supporting means permitting the base with the fuse contacts thereon to be bodily reversed in position with respect to the cabinet so that the said electrical connection may extend as desired either between the last said fuse contact and a switch contact of the upper device or between the last said fuse contact and a switch contact of the lower device, the said supporting means enabling the said fuse contacts to be accessible through the said cover opening with the base in either of its said positions.

12. In a fused switch appliance, the combination of an enclosing cabinet having two independent optionally usable openable front covers, one having an opening therein and the other having a similar opening and also having an auxiliary cover relatively movable to open and close the said opening, an insulating base in normally fixed position within the cabinet, a pair of fuse contacts on the base at the front thereof and accessible through the opening in either cover with the cover closed, upper and lower switch devices within the cabinet each comprising a pair of switch contacts and a movable switching means, the said switch devices being inaccessible through the opening in either cover with the cover closed, upper and lower wire terminals within the cabinet connected respectively with switch contacts of the two devices, a wire terminal within the cabinet connected with one fuse contact independently of the switch devices, an electrical connection extending directly between the other fuse contact and one switch contact of one device, supporting means permitting the base with the fuse contacts thereon to be bodily reversed in position with respect to the cabinet so that the said electrical connection may extend as desired either between the last said fuse contact and a switch contact of the upper device or between the last said fuse contact and a switch contact of the lower device, the said supporting means enabling the said fuse contacts to be accessible through the said opening in either cover with the base in either of its said positions, and means carried by the cabinet and including a manually operable handle on the exterior thereof for moving the said switching means to make and break electrical connection between the contacts of the respective devices, the said handle when used with the second said cover serving to prevent the opening of the auxiliary cover when the said switching means are in circuit making positions and serving to prevent the movement of the said means to their circuit making positions when the auxiliary cover is open.

13. In a fused switch appliance, the combination of an insulating base in normally fixed relationship to a rear supporting wall, a pair of fuse contacts on the base at the front thereof, upper and lower switch devices each comprising a pair of switch contacts and a movable switching means, manually operable means for moving the said switching means to make and break electrical connection between the contacts of the respective devices, upper and lower wire terminals connected respectively with switch contacts of the two devices, a wire terminal connected with one fuse contact independently of the switch devices, an electrical connection connected directly between the other fuse contact and one switch contact of the one device, and supporting means permitting the switch contacts and also the base with the fuse contacts thereon to be bodily reversed as a unit so that the last said electrical connection may extend as desired either between the last said fuse contact and a switch contact of the upper device or between the last said fuse contact and a switch contact of the lower device.

14. In a fused switch appliance, the combination of an insulating base in normally fixed spaced relationship to a rear supporting wall, a pair of fuse contacts on the base at the front thereof, upper and lower pairs of opposed stationary switch contacts located at least in part behind a transverse plane through the rear part of the base, a rectilinearly movable switching member located at least in part behind the said base and comprising two conducting elements normally engaging switch contacts of the corresponding pairs to establish electrical connections between them, manually operable means supported independently of the base for moving the said switching member substantially parallelly with the rear face of the base to disengage the conducting elements thereof from or to re-engage them with the said switch contacts, upper and lower wire terminals connected respectively with switch contacts of the two pairs, a wire terminal connected with one fuse contact independently of the switch contacts, an electrical connection extending directly between the other fuse contact and one switch contact of the one pair, and supporting means permitting the switch contacts and also the base with the fuse contacts thereon to be bodily reversed as a unit with respect to the said manually operable means so that the last said electrical connection may extend as desired either between the last said fuse contact and a switch contact of the upper pair or between the last said fuse contact and a switch contact of the lower pair.

15. In a fused switch appliance, the combination of an enclosing cabinet having an openable front cover having an opening therein, an insulating base in normally fixed position within the cabinet, a pair of fuse contacts on the base at the front thereof and accessible through the said cover opening with the cover closed, upper and lower switch devices within the cabinet each comprising a pair of switch contacts and a movable switching means. the said switch devices being inaccessible through the said cover opening with the cover closed, means manually operable from the exterior of the cabinet for moving the said switching means to make and break electrical connection between the contacts of the respective devices, upper and lower wire terminals within the cabinet connected respectively with switch contacts of the two devices, a wire terminal within the cabinet connected with one fuse contact independently of the switch devices, an electrical connection extending directly between the other fuse contact and one switch contact of one device, and supporting means permitting the switch contacts and also the base with the fuse contacts thereon to be bodily reversed as a unit with respect to the cabinet so that the last said electrical connection may extend as desired either between the last said fuse contact and a switch contact of the upper device or between the last said fuse contact and a switch contact of the lower device, the said supporting means enabling the said fuse contacts to be accessible through the said opening in the cover with the unit in either of its said positions.

16. In a fused switch appliance, the combination of an insulating base, a pair of fuse contacts on the base, a plurality of switch devices spaced from each other and each comprising two contacts and a movable switching means, manually operable means for moving the said switching means to make and break electrical connection between the contacts of the respective devices, wire terminals connected respectively with the switch contacts of the two devices, a wire terminal connected with one fuse contact independently of the switch devices, a separable electrical connection extending directly between the other fuse contact and one switch contact of one device, and supporting means permitting the base with the fuse contacts thereon to be bodily reversed in position with respect to the said switch devices so that the last said electrical connection may extend as desired either between the last said fuse contact and a switch contact of one device or between the last said fuse contact and a switch contact of another device.

17. In a fused switch appliance, the combination of an insulating base, a pair of fuse contacts on the base, a plurality of switch devices spaced from each other and each comprising two contacts and a movable switching means, manually operable means for moving the said switching means to make and break electrical connection between the contacts of the respective devices, wire terminals connected respectively with the switch contacts of the two devices, a wire terminal supported on the base and connected with one fuse contact independently of the switch devices, a separable electrical connection extending directly between the other fuse contact and one switch contact of one device, and supporting means permitting the base with the fuse contacts and the last said terminal thereon to be bodily reversed in position with respect to the said switch devices so that the last said electrical connection may extend as desired either between the last said fuse contact and a switch contact of one device or between the last said fuse contact and a switch contact of another device.

18. In a fused switch appliance, the combination of an insulating base in normally fixed spaced relationship to a rear supporting wall, a pair of fuse contacts on the base at the front thereof, upper and lower pairs of opposed stationary switch contacts located at least in part behind a transverse plane through the rear part of the base, rectilinearly movable switching means located at least in part behind the said base and comprising conducting elements normally engaging the switch contacts of the corresponding pairs to establish electrical connections between them, manually operable means supported independently of the base for moving the said switching means substantially parallelly with the rear face of the base to disengage the conducting elements thereof from or to re-engage them with the said switch contacts, upper and lower wire terminals connected respectively with the switch contacts of the said pairs, a wire receiving terminal connected with one fuse contact independently of the switch contacts, a separable electrical connection extending directly between the other fuse contact and one switch contact of one pair, and supporting means permitting the base with the fuse contacts thereon to be bodily reversed in position with respect to the said switch contacts so that the last said electrical connection may extend as desired either between the last said fuse contact and a switch contact of one pair or between the last said fuse contact and a switch contact of another pair.

19. In a fused switch appliance, the combination of a rear supporting device, upper and lower pairs of switch contact supporting elements extending forward from the supporting device, an insulating base normally supported by the said elements and held thereby in fixed spaced relationship with the said supporting device, a pair of fuse contacts on the base at the front thereof, upper and lower pairs of opposed stationary switch contacts carried respectively by the said supporting elements and located at least in part behind a transverse plane through the rear part of the base, rectilinearly movable switching means located at least in part behind the said base and comprising conducting elements normally engaging the switch contacts of the corresponding pairs to establish electrical connections between them, manually operable means supported independently of the base for moving the said switching means substantially parallelly with the rear face of the base to disengage the conducting elements thereof from or to re-engage them with the said switch contacts, upper and lower wire terminals connected respectively with the switch contacts of the said pairs, a wire receiving terminal connected with one fuse contact independently of the switch contacts, a separable electrical connection extending directly between the other fuse contact and one switch contact of one pair, and means for detachably connecting the base to the said supporting elements, the said means permitting the base with the fuse contacts thereon to be bodily reversed in position with respect to the said switch contacts so that the last said electrical connection may extend as desired between the last said fuse contact and a switch contact of one pair or between the last said fuse contact and a switch contact of another pair.

20. In a fused switch appliance, the combination of an enclosing cabinet having an openable front cover having an opening therein, an insulating base in normally fixed position within the cabinet, a pair of fuse contacts on the base at the front thereof and accessible through the said cover opening with the cover closed, upper and lower switch devices within the cabinet each comprising a pair of switch contacts and a movable switching means, the said switch devices being inaccessible through the said cover opening with the cover closed, means manually operable from the exterior of the cabinet for moving the said switching means to make and break electrical connection between the contacts of the respective devices, upper and lower wire terminals within the cabinet connected respectively with switch contacts of the two devices, a wire terminal within the cabinet connected with one fuse contact independently of the switch devices, a separable electrical connection extending directly between the other fuse contact and one switch contact of one device, and supporting means permitting the base with the fuse contacts thereon to be bodily reversed in position with respect to the said switch devices so that the last said electrical connection may extend as desired either between the last said fuse contact and a switch contact of one device or between the last said fuse contact and a switch contact of another device, the said supporting means enabling the said fuse contacts to be accessible through the said cover opening with the base in either of its said positions.

In testimony whereof I have hereunto set my hand this 6th day of September, 1927.

JOSEPH SACHS.